US005083145A

United States Patent [19]

Gundlach et al.

[11] Patent Number: 5,083,145

[45] Date of Patent: Jan. 21, 1992

[54] NON-ARCING BLADE PRINTER

[75] Inventors: Robert W. Gundlach, Victor; Richard F. Bergen, Ontario, both of N.Y.

[73] Assignee: Xerox Corporation, Stamford, Conn.

[21] Appl. No.: 544,560

[22] Filed: Jun. 27, 1990

[51] Int. Cl.[5] .................... G01D 15/06; H01T 19/04; G03G 15/02

[52] U.S. Cl. .................................. 346/159; 250/325; 355/221

[58] Field of Search ................ 346/159; 250/324–326; 355/221

[56] References Cited

U.S. PATENT DOCUMENTS

| | | | |
|---|---|---|---|
| 2,836,725 | 5/1958 | Vyverberg | 250/49.5 |
| 2,879,395 | 3/1959 | Walkup | 250/49.5 |
| 3,396,308 | 8/1968 | Whitmore | 317/4 |
| 3,598,991 | 8/1971 | Nost | 250/49.5 |
| 3,711,710 | 1/1973 | Wright | 250/49.5 |
| 3,887,809 | 6/1975 | Marx et al. | 250/324 |
| 3,959,690 | 5/1976 | Leibrecht | 317/4 |
| 4,100,411 | 7/1978 | Davis | 250/324 |
| 4,155,093 | 5/1979 | Fotland et al. | 346/159 |
| 4,174,170 | 11/1979 | Yamamoto et al. | 355/3 |
| 4,349,359 | 9/1982 | Fitch et al. | 55/151 |
| 4,414,603 | 11/1983 | Masuda | 361/227 |
| 4,463,363 | 7/1984 | Gundlach et al. | 346/159 |
| 4,524,371 | 6/1985 | Sheridon et al. | 346/159 |
| 4,538,163 | 8/1985 | Sheridon | 346/159 X |
| 4,626,876 | 12/1986 | Miyagawa et al. | 346/160 |
| 4,763,141 | 8/1988 | Gundlach et al. | 346/158 |

FOREIGN PATENT DOCUMENTS

| | | |
|---|---|---|
| 53-64378 | 12/1978 | Japan . |
| 55-73070 | 2/1980 | Japan . |

*Primary Examiner*—George H. Miller, Jr.
*Attorney, Agent, or Firm*—William A. Henry, II

[57] ABSTRACT

A printing apparatus includes a charging device for charging the surface of a receptor with the charging device including a ribbon coronode with field modifying electrodes parallel to the ribbon that decrease the possibility of arcing.

10 Claims, 1 Drawing Sheet

NON-ARCING BLADE PRINTER

FIELD OF THE INVENTION

Hereby cross-referenced, and incorporated herein by reference, is copending application of the same assignee, U.S. Ser. No. 07/544,440, entitled "NON-ARCING BLADE CORONODE" by Robert W. Gundlach and Richard F. Bergen, filed June 27, 1990.

The present invention relates to a charging device for depositing charge on an adjacent surface. More particularly, it is directed to a non-arcing blade coronade for use in such a device. The device is usable in a xerographic reproduction system for generating a flow of ions onto an adjacent imaging surface for altering or changing the electrostatic charge thereon. In addition, the non-arcing blade coronode is used in a printing apparatus wherein ions are generated and transported in a housing and modulated in a slit in order to print a specific pattern on a charge receptor.

BACKGROUND OF THE INVENTION

In the electrophotographic reproducing arts, it is necessary to deposit a uniform electrostatic charge on an imaging surface, which charge is subsequently selectively dissipated by exposure to an information containing optical image to form an electrostatic latent image. The electrostatic latent image may then be developed and the developed image transferred to a support surface to form a final copy of the original document.

In addition to precharging the imaging surface of a xerographic system prior to exposure, corona devices are used to perform a variety of other functions in the xerographic process. For example, corona devices aid in the transfer of an electrostatic toner image from a reusable photoreceptor to a transfer member, the tacking and detacking of paper to the imaging member, the conditioning of the imaging surface prior to, during, and after the deposition of toner thereon to improve the quality of the xerographic copy produced thereby.

Both D.C. and A.C. type corona devices are used to perform many of the above functions.

The conventional form of corona discharge device for use in reproduction systems of the above type is shown generally in U.S. Pat. No. 2,836,725 in which a conductive corona electrode in the form of an elongated wire is connected to a corona generating D.C. voltage. The wire is partially surrounded by a conductive shield which is usually electrically grounded. The surface to be charged is spaced from the wire on the side opposite the shield and is mounted on a grounded substrate. Alternately, a corona device of the above type may be biased in a manner taught in U.S. Pat. No. 2,879,395 wherein an A.C. corona generating potential is applied to the conductive wire electrode and a D.C. potential is applied to the conductive shield partially surrounding the electrode to regulate the flow of ions from the electrode to the surface to be charged. Other biasing arrangements are known in the prior art and will not be discussed in great detail herein.

Some of the problems with these devices are that the wires have a propensity for vibration, singing and sagging, especially when they are used for charging over a long distance perpendicular to the process direction, and it is difficult to use them placed closed to the surface to be charged. Also, they are sensitive to breakage as well as difficult to mount.

Various approaches to answering these problems have been tried in the past. For example, U.S. Pat. No. 3,711,710 discloses a corona charging system wherein a plurality of ion discharging coronodes, made from thin conductive strips, which charge the surface of a receiving medium within a document reproduction machine. U.S. Pat. No. 3,959,690 is directed to a corona charging element for an electrophotographic reproduction machine that includes a coronode member in the form of a metal strip which charges a conductive photoreceptor surface by discharging an ion charging current directly onto the photoreceptor surface. An electrostatic precipitator apparatus is disclosed in U.S. Pat. No. 4,349,359 that includes an ion generating electrode in the form of a long twisted strip that charges the surface of collecting plates. U.S. Pat. No. 4,626,876 discloses a solid state corona discharger that includes a pair of parallel strip-shaped A.C. electrodes that discharge an ion charging current onto the surface of a photosensitive member. A particle charging apparatus is shown in U.S. Pat. No. 4,414,603 that includes a group of parallel, narrow strip-shaped corona electrodes which collectively discharge an electric field to within a designated charging space when activated by an A.C. source voltage. Although these attempts at solving the above-mentioned charging problem have had some success, they have not been entirely satisfactory.

From a printing point of view, industry has desired to provide a reliable, high resolution non-contacting printing system. One approach to this end is ion projection printing which, in one form, entails depositing electrostatic charges in a latent image pattern directly upon a charge receptor surface and then rendering the charge pattern visible, in some known manner. Clearly such a system would have decided benefits in machine design as compared to the known contact printing arrangements, as it would overcome the primary contact printing problem of friction and mechanical wear. Typically, ion projection printing comprises the generation of ions in an ion stream and the control of the ions which may reach a charge receptor surface.

Numerous ion generating devices are available for printing or charging purposes. For example, in U.S. Pat. No. 4,463,363 there is taught a D.C. air breakdown form of ion generator. In U.S. Pat. No. 4,524,371 a fluid jet assisted ion projection printing apparatus is disclosed that includes a housing having ion generation and ion modulation regions. A bent path channel, disposed through the housing directs and transports fluids with ions entrained therein adjacent an array of modulation electrodes which control the passage of ion beams from the device. Generation of charged particles in U.S. Pat. No. 4,155,093 is accomplished by extracting them from a high density source provided by an electrical gas breakdown in an electrical field between two conducting electrodes separated by an insulator. A corona discharge unit is used in conductive toner transfer in a copier in U.S. Pat. No. 4,174,170. The corona discharge unit includes a slit to permit transfer of conductive toner particles onto a copy paper charged by the corona unit. The distance between the slit and a corona wire is 5 mm. U.S. Pat. No. 3,396,308 discloses a web treating device for generating a flow of ionized gas. This device includes an opening through which the gas is directed towards a receptor surface. An elongated hollow housing 11 has tapered sides 14 terminating in a pair of lips 15 which form a narrow and elongated slot 16. U.S. Pat. Nos. 3,598,991 and 4,100,411 show electrostatic charging devices including a corona wire surrounded by a conductive shield. In the U.S. Pat. No. 3,598,991, a slit 13 is formed in the shield to allow ions to flow from wire 12 to a photoconductive surface 2 to deposit an electric charge thereon. In the U.S. Pat. No. 4,100,411, a pair of lips 16 and 17 define a corona ion slit 18. Japanese Patent Document No. 55-73070 discloses a powder image transfer type electrostatic copier that includes a corona discharge device having a slit in a shield plate. In Japanese Patent Document No. 54-156546 a corona charge is shown having a plurality of grating electrodes in the opening part of a corona shield electrode. U.S. Pat. No. 4,763,141 discloses a printing unit that includes a current limited corona wire located 1-5 mm away from biased conductive plates which form a slit that allows ions to pass therethrough onto a receptor surface. All of the above devices are incorporated herein to the extent necessary to practice the present invention. These devices have not been entirely satisfactory in that they are costly, some of them are hard to fabricate and most are inefficient.

SUMMARY OF THE INVENTION

Accordingly, a simpler and more efficient printer/-charging apparatus is disclosed that includes a ribbon coronode mounted edge on and flanked by field-modifying electrodes parallel to the ribbon that are found to decrease any propensity to arc. The field-modifying electrodes also dictate an improved broad distribution of charge from the ribbon to the surface of a receptor. The ribbon coronode is mounted within an insulated housing and located a predetermined distance away from conductive shims oppositely positioned on the bottom of the housing to form a slit for the emitting of ions to a receptor surface. The housing has beveled insulating shields that focus additional ions into the slit.

BRIEF DESCRIPTION OF THE DRAWINGS

The foregoing and other features of the instant invention will be more apparent from a further reading of the specification, claims and from the drawings in which:

Figure 1:
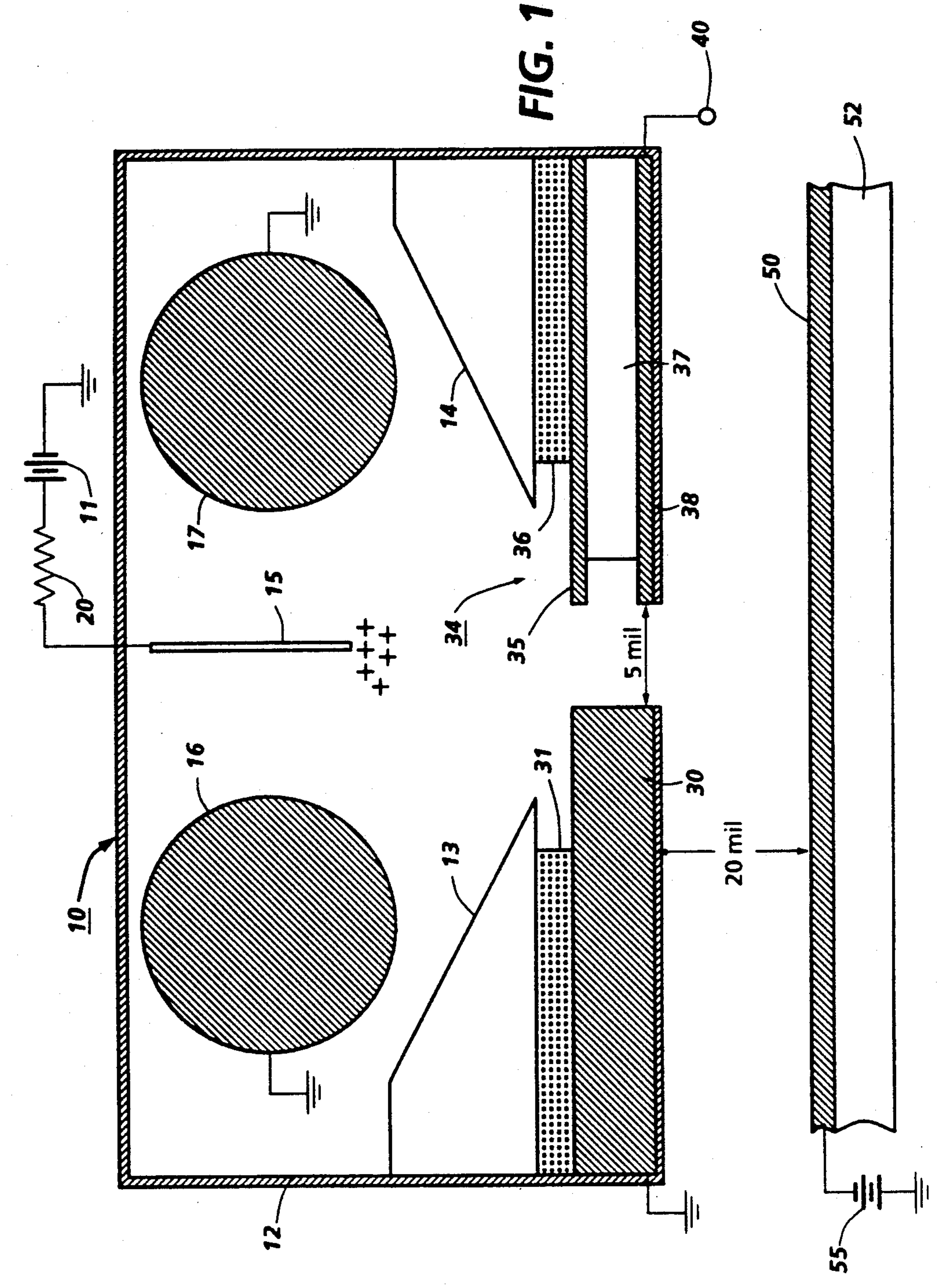
FIG. 1 is an enlarged elevational view of the printing/charging unit in accordance with the present invention.

While the invention will be described hereinafter in connection with a preferred embodiment, it will be understood that no intention is made to limit the invention to that disclosed embodiment. On the contrary, it is intended to cover all alternatives, modifications, and equivalents as may be included within the spirit and scope of the invention as defined by the appended claims.

DETAILED DESCRIPTION OF THE DRAWINGS

For a general understanding of the features of the present invention, reference is had to the drawings. In the drawings, like reference numerals have been used throughout to designate identical elements.

A novel ion printing unit is shown in FIG. 1 as 10 and includes an insulating rectangular housing of a material such as plexiglass. Conductive solid electrode 30 and sandwich electrode 34 are attached by conventional means to the bottom of the housing 12 and define a slit or opening through which ions from coronode 15 are driven. The conductive solid electrode 30 is about 5 mils thick and extends the height of the slit. Electrode 34 consist of an insulator 37 having a thickness of about 3 mils, an upper conductor electrode 35 of about 1 mil in thickness and a series of addressable electrodes 38 of about 1 mil in thickness that are spaced from each other on the bottom of insulator 37. The addressable electrodes are individually controlled in a conventional manner by applying signals 40. A positive high voltage power supply 11 furnishes the current that flows through resistor 20 supplying energy to coronode 15. A charge retentive surface 50 is mounted on a conductive substrate 52 which is biased by power source 55. Current limited, low capacitance ribbon 15 is located very close (2.2 mm) to the conductive electrodes 30 and 34 that form the slit. Insulating shields in the form of 30 degree beveled wedges 13 and 14 are provided to focus additional ions to the center of the slit. An insulating adhesive of about 3 mils in thickness separates wedge 13 from electrode 30 and insulator 36 of about 3 mils in thickness separates wedge 14 from electrode 35. The beveled insulators acquire charges that produce fields to drive additional ions out thru the slit. At the corona side slit edges there are additional fringe fields that aid in pumping ions out of the slit. However, by providing a strong field across the slit to overcome the pumping fields, the charges will be driven to the opposing solid electrode 30. To accomplish gating the ion stream through the slit, a potential difference is applied between conductive electrodes 38 and 30 on opposite edges of the slit so that ion flow can be controlled.

The magnitude of the efficiency gain due to the insulating wedges is a function of the distance between the wedge insulators and the coronode blade or ribbon 15.

Ion printing unit 10 is positioned in a plane parallel with respect to the charge retentive surface 50 and comprises a coronode in the form of a grounded thin (about 1-3 mils thick) conductive blade or ribbon 15. Rod shaped electrodes 16 and 17 are placed on opposite sides of ribbon 15 for a purpose that will be explained hereinafter. Rods 16 and 17 have a diameter of about 2.4 mm and are spaced away from ribbon 15 by about 1.5 mm while a tip of ribbon 15 is spaced about 3.3 mm away from upper conductor electrode 35. Solid conductor 30 is about 0.5 mm away from photoreceptor 50. Ribbon coronode 15 has a number of advantages over a wire coronode. The ribbon or blade 15 is a rigid structure and not as difficult to mount as stringing a wire, and not sensitive to breakage, singing, or sagging that create problems with thin wire coronodes. One concern with a ribbon or blade, however, is its tendency to arc. This is possibly because, in addition to its higher capacitance, the fields are less divergent from the corona emitting edge than they are from a wire. Fields from a wire exceed the Paschen limit for air breakdown only in a small region surrounding its surface. From a blade, the ionization region will be larger and, in fact, the fields across the entire gap to the corona side conductive surfaces are higher than desirable. That is, the extra conducting surface at high potential that extends above the corona emitting edge raises the potential of all of the space around the edge of a ribbon. The voltage required to produce corona is thereby increased, but also the second derivative of voltage with respect to distance toward the ground plane is lowered. In other words, the high fields extend further toward the coronode side conductors, whereas in the case of the wire fields diminish more quickly with distance from the coronode.

An answer to this possible arcing problem with blade charging is shown in FIG. 1 as comprising a low potential grounded electrodes 16, 17 (possibly even opposite in polarity) on each side of ribbon 15. The electrodes are arranged in position and biased so that all lines of force extending from the sides of the ribbon 15 terminate on these electrodes, while the field lines from the corona active tip radius extend directly to conductors 30 and 35. Thus, the fields spread out to conductors 30 and 35, reducing their associated voltage magnitude in the air near the conductors, and, therefore, the tendency to arc is reduced. This ion source (15, 16, and 17) (AC or DC) is applicable for general charging.

Ion emitting means 15 is shown in the presence of conductors 16 and 17 which allow for a broad distribution of the ions. Typically, less than 15% of ions will travel to a receptor in an electrostatographic copier that employs a wire/conductor corotron. In contrast, conductors 16 and 17 as configured in FIG. 1 alters the field or expands the field lines to increase travel of ions toward a receiver to 100% while simultaneously minimizing the possibility of arcing. The conductors 16 and 17 are placed in appropriate position to accept a barely detectable amount of current ensuring that all additional current from the ribbon 15 will flow toward conductors 30 and 35 where fringe fields, at the edges of the slit forming conductors 30 and 35, will assist in driving ions through and out of the slit. Ribbon 15 could be shaped as a wedge, if desired.

It should now be apparent that a novel printing device is disclosed in which the coronode comprises a thin conductive strip that is configured edge on with electrodes positioned on opposite sides of the conductive strip. This configuration is significant in that it tailors the field line distribution to provide maximum charges to the slit with minimum possibility of arcing.

While this invention has been described with reference to the structures disclosed herein, they are not confined to the details as set forth and are intended to cover modifications and changes that may come within the scope of the following claims.

What is claimed is:

1. In an electrostatographic marking apparatus for placing electrostatic charges upon a charge receptor including a slit through which charges exit, the improvement in the electrostatographic marking apparatus of a charging device adapted to direct a uniform charge stream into the slit, comprising:

a corona producing means in the form of a thin conductive strip configured edge-on so as to present a small radius to the slit;

electrode means positioned on opposite sides of said conductive strip; and high voltage means connected to said corona producing means and adapted to apply sufficient voltage to said corona producing means that corona ions are emitted from said corona producing means toward a surface to be charged, and wherein said electrode means serves to tailor field distribution lines from said conductive strip in order to provide maximum charge toward said slit with minimal possibility of arcing.

2. The charging device of claim 1, wherein said conductive strip is about 1-3 mils thick.

3. The charging device of claim 1, wherein said electrodes are cylindrical in shape.

4. The charging device of claim 1, wherein said conductive strip is wedge shaped.

5. In an electrostatographic marking apparatus for placing electrostatic charges upon a charge receptor including a slit through which charges exit, the improvement in the electrostatographic marking apparatus of a charging device adapted to direct a uniform charge stream into the slit, comprising:

a corona producing means in the form of a thin conductive strip configured edge-on so as to present a small radius to the slit;

oppositely charged electrode means positioned on opposite sides of said conductive strip, said electrode means having a blunt surface at least an order of magnitude greater than said small radius of said corona producing means; and high voltage means connected to said corona producing means and adapted to apply sufficient voltage to said corona producing means that corona ions are emitted from said corona producing means toward a surface to be charged, and wherein said oppositely charged electrode means serves to tailor field distribution lines from said conductive strip in order to provide maximum charge toward said slit with minimal possibility of arcing.

6. The marking apparatus of claim 5, wherein said oppositely charged electrode means comprises cylindrical rods, and wherein said cylindrical rods have a diameter of about 2.4 mm and are spaced laterally about 1.5 mm away from said corona producing means.

7. In an electrostatographic marking apparatus for placing electrostatic charges upon a charge receptor including a slit through which charges exit, the improvement in the electrostatographic marking apparatus of a charging device adapted to direct a uniform charge stream into the slit, comprising:

a corona producing means in the form of a thin conductive strip configured edge-on so as to present a small radius to the slit;

low potential, grounded electrode means positioned on opposite sides of said conductive strip and biased so that all lines of force extending from the sides of said corona producing means terminate on said electrode means while field lines from said small radius of said corona producing means extend directly toward the charge receptor; and high voltage means connected to said corona producing means and adapted to apply sufficient voltage to said corona producing means that corona ions are emitted from said corona producing means toward a surface to be charged, and wherein said electrode means serves to tailor field distribution lines from said conductive strip in order to provide maximum charge toward said slit with minimal possibility of arcing.

8. The marking apparatus of claim 7, wherein said electrode means is oppositely charged with respect to the charge on said corona producing means.

9. The marking apparatus of claim 8, wherein said oppositely charged electrode means comprises cylindrical rods, and wherein said cylindrical rods have a diameter of about 2.4 mm and are spaced laterally about 1.5 mm away from said corona producing means.

10. The marking apparatus of claim 9, wherein said oppositely charged electrode means is positioned to accept a barely detectable amount of current from said corona producing means.

* * * * *